July 7, 1959
E. B. GRAVES
2,894,143
A.C.-D.C. X-RAY CONTROL CONNECTOR
Filed Nov. 6, 1957
2 Sheets-Sheet 1
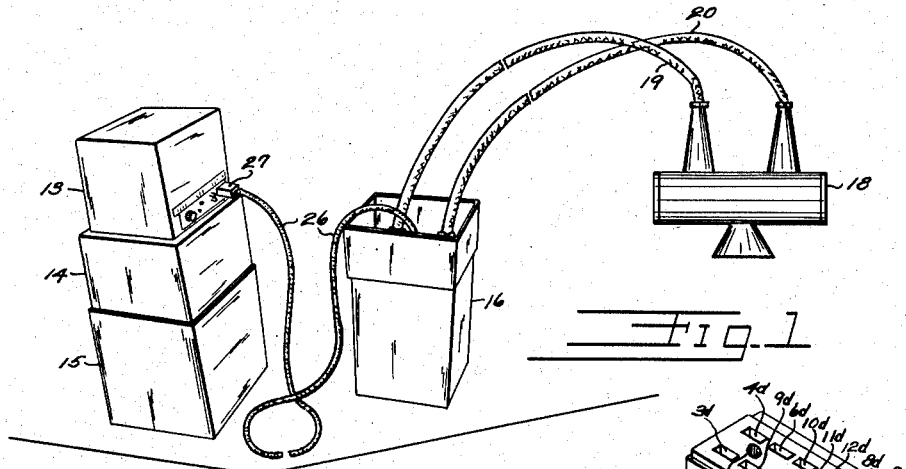
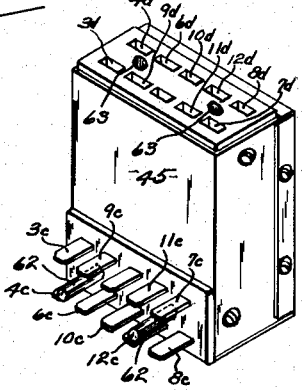
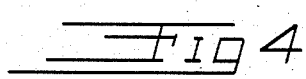
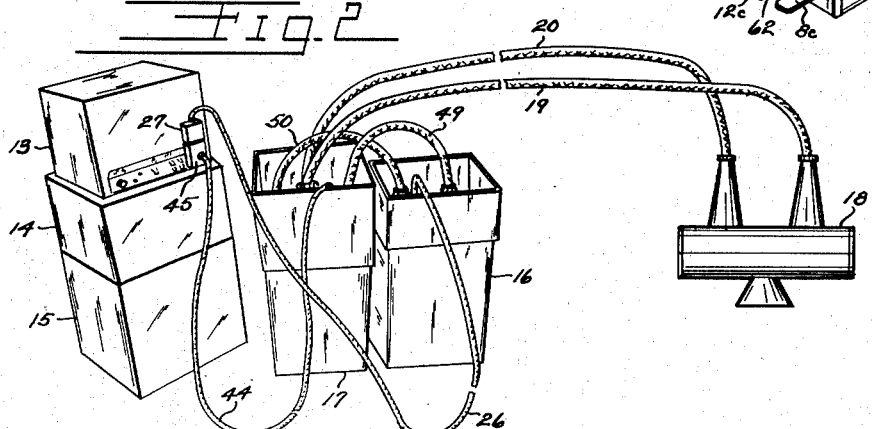
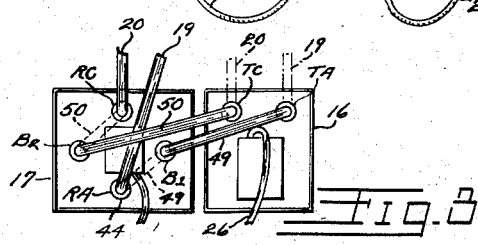
INVENTOR.
EDWARD B. GRAVES
BY
Hyde, Meyer, Baldwin & Doran
ATTORNEYS July 7, 1959     E. B. GRAVES     2,894,143
A.C.-D.C. X-RAY CONTROL CONNECTOR
Filed Nov. 6, 1957     2 Sheets-Sheet 2
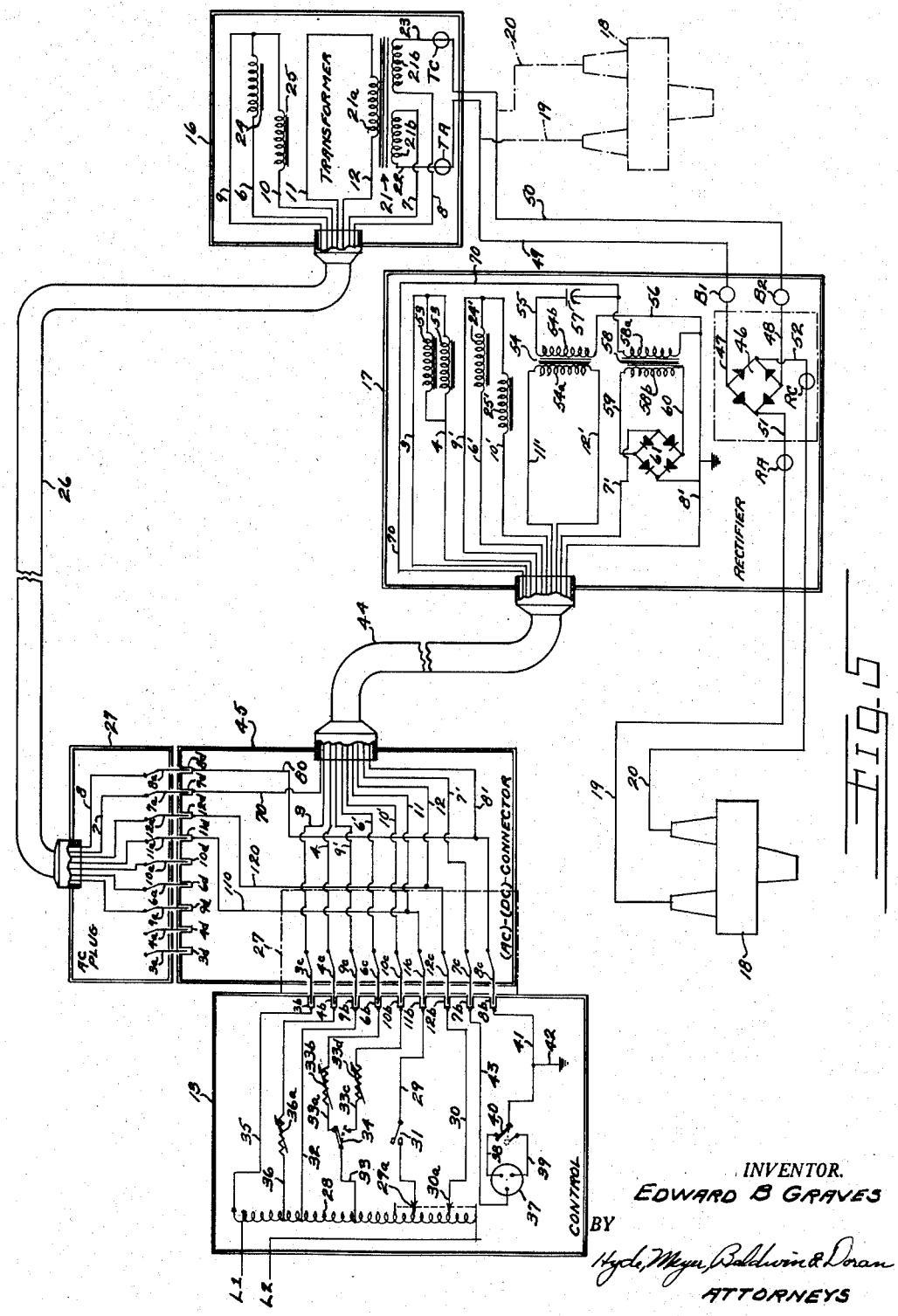
INVENTOR.
EDWARD B GRAVES
BY
ATTORNEYS

United States Patent Office 2,894,143
Patented July 7, 1959

2,894,143

A.C.-D.C. X-RAY CONTROL CONNECTOR

Edward B. Graves, South Euclid, Ohio, assignor to Picker X-Ray Corporation Waite Manufacturing Division, Inc., Cleveland, Ohio, a corporation of Ohio Application November 6, 1957, Serial No. 694,822

2 Claims. (Cl. 250—104)

This invention relates to improvements in an alternating current or direct current X-ray control connector.

One of the objects of the present invention is to provide in X-ray energizing apparatus, the combination of a transformer case having a high tension transformer therein and having cable receptacles for connection to the anode and cathode respectively of an X-ray tube, these receptacles electrically connected to the transformer, a rectifier case having a wave rectifier with rectifier valves therein and having two cables operatively connected to the rectifier for input of alternating current to the rectifier, and these two cables terminating in plugs adapted to fit into the anode and cathode cable receptacles of the high tension transformer. It results from this construction that portable X-ray equipment may be quickly connected to use alternating current in the X-ray tube, in which case the anode and cathode cables of the tube are plugged into the suitable receptacles in the transformer; or to use direct current in the tube in which case the input cables for the rectifier are plugged into the anode and cathode receptacles in the transformer after which the the anode and cathode cables of the X-ray tube are plugged into suitable receptacles adapted to receive them in the rectifier to connect with the rectified current.

The invention also supplies with the above combination a control case having suitable control circuits for use with the equipment using either A.C. or D.C. current, together with other control and auxiliary circuits in both the transformer case and in the rectifier case so arranged that when the transformer is used to supply alternating current directly to the X-ray tube, an electrical cord permanently connected to the equipment in the transformer case may be plugged into the control case and the entire equipment is ready for operation. On the other hand, if direct current is to be used in the X-ray tube, then an adapter plug is provided which has conductors permanently connected in the rectifier case, this adapted plug being first plugged into the control case and having suitable electrical receptacles to receive the connections from the plug leading from the transformer case, thus providing equipment which is readily arranged in any desired manner.

Other objects and advantages of the invention will be apparent from the accompanying drawing and description and the essential features thereof will be set forth in the appended claims.

In the drawings:

Fig. 1 is a perspective view showing the control case, transformer case and X-ray tube connected to operate the tube on A.C. current;

Fig. 2 is a perspective view showing the control case, rectifier case and transformer case and X-ray tube connected to utilize direct current in the tube;

Fig. 3 is a diagrammatic top plan view of the transformer and rectifier cases of Fig. 2 illustrating the cable connections between them;

Fig. 4 is a perspective view, enlarged, of the adapter plug which appears in Fig. 2; while Fig. 5 is a diagrammatic view showing the electrical circuits necessary for the operation of my invention.

The invention herein disclosed and described is particularly useful in a mobile army X-ray unit which is adapted to be shipped from place to place and which must be set up quickly for operation. Referring to Figs. 1 and 2, a control case is shown at 13 holding certain control equipment as will be later described. It rests on shipping containers 14 and 15 in which the control case is enclosed for shipment and which form a stand to rest the case upon when the equipment is in use as indicated in the drawings. This particular control case is disclosed and claimed in the copending application of James C. Craig, Serial No. 648,854, filed March 27, 1957, and the details of the shipping case have nothing to do with the present invention. The other units herein described for use in connection with my invention are the portable transformer case 16, the portable rectifier case 17 and an X-ray tube 18 which is of any known variety having the usual anode and cathode energized through the cables 19 and 20 in the usual fashion.

Referring first to the transformer case 16, in this case is the usual X-ray high tension transformer 21 having a primary winding 21a and a split secondary winding 21b. The transformer primary is energized through lines 11 and 12 while the secondary is connected by lines 22 and 23 to the receptacles TA and TC respectively which are receptacles for receiving the X-ray tube cables 19 and 20. The central secondary circuit is connected through lines 7 and 8 as will presently appear. In the transformer case also there is a filament transformer, or preferably as in this case, two filament transformers 24 and 25, of which only the primary windings are shown, it being understood that the secondary windings are connected to the filaments in the X-ray tube 18 in the usual manner. Those familiar with this art understand that a small filament gives better definition and a large filament is used for the higher capacities.

The primary winding of transformer 24 is energized through lines 6 and 9 and the primary of transformer 25 is energized through lines 10 and 9.

A first electrical cord 26 connects the conductors 9, 6, 10, 11, 12, 7, and 8 of the transformer case to respective male prongs or plugs in the connector plug 27. These prongs are given the same reference character as those indicated in the transformer case but with suffix "a." It will be noted that there are also prongs 3a and 4a which perform no particular function in the plug 27 but are necessary to adapt the plug to the various uses described herein. It should be understood that the position of the plug 27 in Fig. 5 is that illustrated in the position of the parts in Fig. 2 of the drawings. When using the equipment as illustrated in Fig. 1 of the drawings, then plug 27 occupies the position indicated in dot-dash lines in Fig. 5.

The control case 13 houses an auto-transformer 28 along which adjustable taps 29a and 30a are movable to select the desired voltage input to the transformer 21. These taps are connected respectively by line 29 to a receptacle opening 11b and by line 30 to receptacle opening 12b which are adapted to receive the prongs 11a and 12a of plug 27 when the plug is in its dot-dash position of Fig. 5. One of these lines, such as 29, is interrupted by an exposure contactor control switch 31. Taps are also provided on the auto-transformer for line 32 and 33 which serve the milliamperage limiters, of which there are two, one for the small X-ray tube filament and the other for the large filament. The line 33 feeds line 33a having the variable resistance 33b for the small filament or line 33c having the variable resistance 33d for serving the larger filament. A switch 34 may be manipulated to select either the line 33a or 33c. The line 32 terminates in the female receptacle 9b. The line 33a terminates in the female receptacle 6b and the line 33c terminates in the female receptacle 10b.

A valve adjuster circuit is provided between line 35 and line 36 tapped off the auto-transformer. Line 35 terminates in the female receptacle 3b and line 36 has in series the adjustable resistance 36a and terminates in the female receptacle 4b.

The auto-transformer is supplied by low voltage current from lines L1, L2.

Also in the control case is a milliammeter 37 which has two connections with lines 38 and 39 respectively for utilizing either a low milliammeter range or a high milliammeter range as selected by switch 40. This switch is connected through line 41 with the female receptacle 8b and is grounded as indicated at 42. The other end of the milliammeter is connected by line 43 to the female receptacle 7b.

The operation of the apparatus and circuits above described and as illustrated in Fig. 1 should now be apparent. The plug 27 is in the dot-dash position indicated in Fig. 5 where the various prongs of the connector plug enter the corresponding receptacles in the control case 13. The anode and cathode cables 19 and 20 of the X-ray tube are connected as indicated in dot-dash lines in Fig. 5 to the receptacles TA and TC in the transformer case 16. The primary 21a of the high tension transformer 21 is supplied with current at the selected kilovoltage through lines 29 and 30, receptacles 11b and 12b, prongs 11a and 12a, of plug 27, and through cord 26 to the transformer case as indicated in Fig. 5. The secondary of this transformer is connected through lines 22 and 23 to the receptacles TA and TC which supply the cables 19 and 20 leading to the X-ray tube. Either the small or large filament of the X-ray tube is selected by the position of switch 34 in the control case and either line 33a or 33c will then supply the primary of transformer 24 or 25 in the transformer case. One side of this line is through conductor 32, receptacle 9b and prong 9a, cord 26 and the line marked 9 in the transformer case 16. The other side of the line is either through line 33a, receptacle 6b and prong 6a, cord 26 and the line marked 6 in the transformer case; or on the other hand through line 33c, receptacle 10b and prong 10a, cord 26 and the lines 6 or 10 in the transformer case. The X-ray tube may then be operated using alternating current by closing the contactor switch 31. In this type of operation, there is capacity current generated in the high tension transformer due to the capacity developed between the transformer windings and the ground in the central secondary circuit connected between lines 7 and 8 in the transformer case 16. This is connected through cord 26, prongs 7a and 8a fitting in receptacles 7b and 8b to the milliameter 37 to read the tube current. The capacity current mentioned just above will not be read on the direct current milliammeter 37 because it is alternating current and, therefore, no correction is necessary in this type of operation.

Referring now to the hook-up shown in Fig. 2 of the drawings, it is necessary to describe the rectifier case 17, the second cord 44 and the adapter plug 45.

Turning first to the rectifier case 17 as shown diagrammatically in Fig. 5, a rectifier 46 is shown of the four valve type connected by lines 47 and 48 respectively to receptacles B1 and B2 for the input of alternating current to the rectifier by means of cables 49 and 50. These cables are preferably permanently connected at B1 and B2 so that they will not be lost in transit. The other ends of these cables are provided with plugs which fit properly in the receptacles TA and TC so that this connection may be made as indicated in Figs. 2, 3 and 5. Preferably also the cable 49 may be placed in the dotted line position of Fig. 3 for transportation of the equipment or when the rectifier case is not in use at which time the free end of cable 49 has its plug inserted in the socket RA. Likewise the cable 50 may be stored in the broken line position of Fig. 3 with the plug at the end of this cable stored in the socket or receptacle B2. The output of the rectifier 46 is connected by lines 51 and 52 to the receptacles RA and RC adapted to receive the anode and cathode energizing cables 19 and 20 as indicated in full lines in Fig. 5.

For energizing the filaments of the valves in rectifier 46, there is provided in the rectifier case valve filament transformers 53 of which only the transformer primaries are shown in the diagram, it being understood that the secondaries of these transformers are connected to the valve tubes in rectifier 46 in the usual manner. The primaries of transformers 53 are supplied through lines 3 and 4 which are permanently connected through electrical cord 44 into the adapter plug 45 and to the contact prongs 3c and 4c which are in position to engage the receptacles 3b and 4b previously described.

Repeated in the rectifier case are X-ray filament supply transformers 24' and 25' which are identical with transformers 24 and 25 previously described. These are serviced through lines 9', 6' and 10' which are analogous to lines 9, 6 and 10 previously described. These lines 9', 6' and 10' are connected through cord 44 respectively with contact prongs 9c, 6c and 10c in adapter plug 45 in position to mate with the receptacles 9b, 6b and 10b previously described.

When utilizing the rectifier as shown in Fig. 2 and as shown in the full line connections of Fig. 5, the capacity current developed between the high tension transformer windings and the ground is rectified also and would be read on the milliammeter 37 unless a correction were supplied. To supply this correction, a capacity current compensation transformer 54 is provided in the rectifier case and the primary 54a of this transformer is supplied through lines 11' and 12' with the same voltage which is selected at 29a and 30a for the operation of the high tension transformer. The lines 11' and 12' extend through cord 44 into adapter plug 45 where they lead to the contact prongs 11c and 12c in position to mate with the receptacles 11b and 12b previously mentioned. These lines are also connected by jumpers 110 and 120 in plug 45 respectively with contact receptacles 11d and 12d at the top of the plug as appears in Fig. 5. The secondary 54b of transformer 54 is connected by lines 55 and 56 through a condenser 57 to the primary 58a of a transformer 58, whose secondary 58b is connected by lines 59 and 60 to a milliammeter rectifier 61 of the selenium cell type. The output of this rectifier is connected by lines 7' and 8' through cord 44 to similarly numbered lines in the plug 45 which connect respectively with the contact prongs 7c and 8c in position to mate respectively with the contact receptacles 7b and 8b previously described. The line 8' is connected by jumper 80 in plug 45 to contact receptacle 8d at the top of this plug. The central secondary grounded circuit of transformer 21 is connected through line 7, prong 7a, receptacle 7d and line 70 (through cord 44) to the primary of transformer 58. This current component is rectified at 61 and transmitted through line 7', 7c 7b and line 43 to milliammeter 37.

The contact receptacles 3d, 4d, 9d, 6d and 10d shown at the top of plug 45 have no function to perform in the parts as connected there but are merely for accommodation of the associated prongs in plug 27 so as to fit the apparatus for the various uses herein described.

Fig. 4 shows a perspective view of the plug 27. The contact receptacles bearing the "d" suffix are shown at the top of the the plug and the contact prongs bearing the "c" suffix are shown at the lower inside portion of the plug as applied toward the control case 13. The pins 62 and the recesses 63 are only guide members to give a dowel pin connection between plugs 27, 45 and case 13.

The operation of my apparatus as connected in Fig. 2 and in full lines in Fig. 5 should now be apparent. The lines 11, 12, 7 and 8 in transformer case 16 are connected to contact receptacles 11b, 12b, 7b and 8b respectively as previously described except that now they pass through plug 45 utilizing the receptacles 11d, 12d, 7d and 8d at the top of the plug and the contact prongs 11c, 12c, 7c and 8c near the bottom of the plug. The voltage of lines 11 and 12 which is the same as in lines 29 and 30 respectively, is transmitted through lines 11' and 12' to transformers 54 and 58, rectified at 61, and transmitted through lines 7' and 8' through plug 45 to prongs 7c and 8c respectively engaging in receptacles 7b and 8b and thus to milliammeter 37 as a bucking component to the reading on the milliammeter so as to compensate for the capacity current developed in the high tension transformer 21. The X-ray filament transformers 24' and 25' are supplied through lines 9', 6' and 10' which are connected through plug 45 as previously described to the lines 32 and 33 in the same manner as previously described. Thus, the X-ray tube plugged into the receptacles RA and RC is supplied with a fully rectified direct current as is well understood in this art.

The secondary circuits of transformers 24 and 25, when using alternating current in tube 18, are connected to contact pins in jacket TC and then through cord or cable 20 to the cathode of tube 18 in the usual manner. Likewise the secondary circuit of transformers 24' and 25', when using rectified current in tube 18, are connected through contact pins in jacket RC and cord 20 to the cathode of tube 18 in the usual manner. These connections are not shown as they are well known and would only confuse the drawing.

My invention thus supplies three portable cases which are easily transported and quickly connected to supply to an X-ray tube either alternating current or direct current. In each case, by means of plug 27 engaged directly in the control case 13, the alternating supply is completely set up; or with the plug 27 engaged in plug 45 which in turn is engaged in control case 13, the entire apparatus is properly connected for supplying direct current to the X-ray tube. I have thus provided a very convenient and flexible device for use in the field.

What is claimed is:

1. In an X-ray energizing apparatus having a transformer case having a high tension transformer therein and having anode and cathode cable receptacles operatively connected to said transformer, and having a rectifier case having a wave rectifier with rectifier valves therein and having two cables operatively connected to said rectifier for alternating current input thereto and having two cable receptacles operatively connected to said rectifier for direct current output therefrom, and having said two cables terminating in plugs dimensioned to make electrical contact in said anode and cathode cable receptacles respectively, said first named anode and cathode cable receptacles and said second named two cable receptacles having the same dimensions for the anode and cathode cable connections respectively, whereby an X-ray tube may have its anode and cathode cable plugs connected to their corresponding receptacles in either said transformer or said rectifier as desired, and said apparatus including X-ray tube filament transformers in each of said cases, and including a rectifier valve filament transformer in said rectifier case having its secondary connected to the filaments of said valves, and including a control case having electricity sources for said high tension transformer primary and for said filament transformer primaries respectively, each of said sources being electrically connected with a plurality of female electrical contacts in said control case; the combination therewith of a first electrical cord having conductors connected to the primary of said tube filament transformer in said transformer case and having conductors connected to the primary of said high tension transformer, said first cord terminating in a connector plug having a plurality of male electrical contacts electrically connected with their respective conductors and positioned to connect said transformers to their respective sources when said male contacts engage said female contacts, a second electrical cord having conductors connected to the primary of said tube filament transformer in said rectifier case and having conductors connected to the primary of said valve filament transformers, said second cord terminating in an adapter plug having a plurality of male electrical contacts positioned in the same relative positions as the female contacts in said control case connected with their respective sources, said adapter plug having a plurality of male contacts electrically connected with their respective conductors in said second cord and positioned complementary to their respective female contacts in said control case, said adapter plug also having a plurality of female contacts complementary to and adapted to receive said male contacts of said connector plug which are connected with the primary of said high tension transformer, and first electrical jumper connections in said adapter plug between said last named female contacts and said adapter plug male contacts adapted to engage said control case female contacts connected with said high tension transformer primary electricity source.

2. The combination of claim 1 including a central secondary circuit in said high tension transformer secondary and conductors in said first cord connected therewith and male contacts in said connector plug connected to said last named conductors, female contacts in said adapter plug position to receive said last named male contacts, a milliammeter in said control case and electrically connected to ground and to female contacts in said case in relative positions to engage said last named male contacts when said connector plug engages in said control case female contacts, male contacts on said adapter plug in position to engage said milliammeter female contacts in said control case, second electrical jumper connections in said adapter plug between said last named male contacts and said last named adapter plug female contacts, a meter rectifier in said rectifier case and operatively connected by cables in said second cord with said second jumper connections in a direction to buck the voltage in said second jumper connections, a capacity current compensation transformer in said rectifier and having a primary electrically connected through said second cord to said first jumper connections, a meter rectifier transformer in said rectifier case and having its secondary electrically connected to said meter current rectifier, and said compensation transformer having its secondary connected through a condenser to the primary of said meter rectifier transformer.

References Cited in the file of this patent

UNITED STATES PATENTS

| | | |
|---|---|---|
| 1,990,368 | Bouwers | Feb. 5, 1935 |
| 2,360,036 | Boucher | Oct. 10, 1944 |
| 2,829,272 | Ball | Apr. 1, 1958 |